US009681451B1

United States Patent
Liu et al.

(10) Patent No.: US 9,681,451 B1
(45) Date of Patent: Jun. 13, 2017

(54) REDUCING PDCCH INTERFERENCE

(71) Applicant: Sprint Spectrum L.P., Overland Park, KS (US)

(72) Inventors: Chunmei Liu, Great Falls, VA (US); Krishna Sitaram, Chantilly, VA (US); Daniel A. Vivanco, Sterling, VA (US); Hemanth B. Pawar, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 234 days.

(21) Appl. No.: 14/509,615

(22) Filed: Oct. 8, 2014

(51) Int. Cl.
H04W 72/04 (2009.01)

(52) U.S. Cl.
CPC ..... *H04W 72/0486* (2013.01); *H04W 72/042* (2013.01)

(58) Field of Classification Search
CPC ........... H04W 72/0486; H04W 72/042; H04W 28/08; H04L 47/125; H04L 47/14; H04L 5/0048–5/0057; H04L 5/0091–5/0098
USPC ......... 370/329, 235, 236, 237, 238; 455/453
See application file for complete search history.

(56) References Cited

U.S. PATENT DOCUMENTS

| | | | |
|---|---|---|---|
| 7,756,522 B2 * | 7/2010 | Nomiya | H04W 16/06 455/450 |
| 8,203,954 B1 * | 6/2012 | Patel | H04L 45/00 370/235 |
| 8,213,361 B1 * | 7/2012 | Sarkar | H04W 68/025 370/328 |
| 8,755,270 B2 | 6/2014 | Corbett | |
| 2003/0069974 A1 * | 4/2003 | Lu | G06F 9/505 709/226 |
| 2007/0082673 A1 | 4/2007 | Janneteau | |
| 2009/0296641 A1 * | 12/2009 | Bienas | H04W 24/02 370/329 |
| 2010/0009695 A1 * | 1/2010 | Kwon | H04W 16/06 455/452.2 |

(Continued)

OTHER PUBLICATIONS

Jung Wan Shin, Jun Suk Kim, Min Young Chung "Control Channel Load Balancing in Narrow Band Cellular IoT Systems Supporting Coverage Class" 7th International Conference on Intelligent Systems, Modelling and Simulation 2016 DOI 10.1109/ISMS.2016. 47.*

(Continued)

*Primary Examiner* — Mark Rinehart
*Assistant Examiner* — Kenneth P Hunt

(57) ABSTRACT

Disclosed is a method and system for balancing control channel resource allocations between base stations. As disclosed, a first base station provides a first downlink control channel including a first set of air interface resources and a second base station provides a second downlink control channel including a second set of air interface resources, the first set of air interface resources and the second set of air interface resources being mutually exclusive. Upon detecting a threshold difference between (i) an extent of a capacity of the first downlink control channel being unused and (ii) an extent of a capacity of the second downlink control channel being unused, the system may change allocation resources between downlink control channels such that (i) capacity of one of the first and second downlink control channels is increased and (ii) capacity of the other one of the first and second downlink control channels is decreased.

20 Claims, 10 Drawing Sheets

(56) References Cited

U.S. PATENT DOCUMENTS

| | | |
|---|---|---|
| 2010/0210268 A1 | 8/2010 | Lim |
| 2011/0267948 A1 | 11/2011 | Koc |
| 2012/0039170 A1 | 2/2012 | Ball |
| 2012/0250641 A1* | 10/2012 | Sartori ................. H04W 48/12 370/329 |
| 2012/0282964 A1* | 11/2012 | Xiao ...................... H04B 7/024 455/515 |
| 2013/0250882 A1 | 9/2013 | Dinan |
| 2014/0169284 A1 | 6/2014 | Cai et al. |
| 2014/0198659 A1* | 7/2014 | Vargas Bautista .... H04W 28/08 370/236 |
| 2014/0226481 A1 | 8/2014 | Dahod et al. |
| 2015/0016263 A1* | 1/2015 | Zou ...................... H04W 16/08 370/235 |
| 2015/0207750 A1 | 7/2015 | Birkestrand et al. |
| 2015/0304889 A1* | 10/2015 | Qian ................. H04W 72/1289 370/235 |
| 2015/0334744 A1 | 11/2015 | Ji et al. |

OTHER PUBLICATIONS

S. Kucera and D. Lopez-Perez, "Expanding Coverage Range and Control Channel Capacity of Co-Channel LTE Small Cells by Using PDCCH Orthogonalization," 2014 IEEE 80th Vehicular Technology Conference (VTC2014-Fall), Vancouver, BC, 2014, pp. 1-5. doi: 10.1109/VTCFall.2014.6965975.*
U.S. Appl. No. 14/446,395, filed Jul. 30, 2014.
"Enhancing LTE Cell-Edge Performance via PDCCH ICIC", Fujitsu Network Communications Inc. (2011).
Acharya et al., "Heterogeneous Networks in LTE-Advanced".

* cited by examiner

REDUCING PDCCH INTERFERENCE

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover between coverage areas, and other functions related to air interface communication.

In accordance with the air interface protocol, each coverage area may operate on one or more carrier frequencies or ranges of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the base station for instance.

When a UE is within coverage of a base station, the base station may from time to time transmit downlink control signaling to the UE. The purpose of such downlink control signaling may depend on the air interface protocol and the circumstances. By way of example, each coverage area may define a downlink control channel that may carry certain information such as control channel formatting information, a downlink reference signal that UEs may detect as an indication of coverage, system information, paging information, and the like, or may define various downlink control channels for carrying subsets of this information.

In general, a UE may operate in a particular coverage area provided by a base station by transmitting to the base station an "attach" request or the like to register with the base station and trigger reservation of network resources for the UE, and then operating in a connected mode or an idle mode. In the connected mode, the UE may have assigned air interface resources defining an air interface "connection," and the UE and the base station may be set to exchange bearer data with each other, with the base station possibly providing downlink control signaling to the UE to assign specific air interface resources on which the bearer data communication is to occur. After a timeout period of no bearer data communication between the UE and the base station, or for other reasons, the UE may then transition from the connected mode to the idle mode, with the base station releasing the UE's air interface connection so as to conserve air interface resources. In the idle mode, the UE may then monitor a downlink control channel to receive overhead system information and to check for any page messages destined to the UE. If the UE then receives a page message to which the UE will respond and/or if the UE seeks to engage in bearer communication, the UE may then transmit on an uplink control channel to the base station a random access preamble or other such request, to which the base station may respond on a downlink control channel, and the UE may transition back to the connected mode.

OVERVIEW

In practice, a typical cellular base station may transmit control signaling on a set of air interface resources reserved to define a physical downlink control channel (PDCCH). Additionally, the base station may reserve a different set of air interface resources to define a physical downlink shared channel (PDSCH) that the base station can use to carry transmissions on an as-needed basis to one or more UEs operating in a coverage area of the base station. Further, the base station may reserve another set of air interface resources to define a physical uplink shared channel (PUSCH) that the base station can use to receive transmissions from the one or more UEs. In this arrangement, the PDCCH may carry downlink control information (DCI) messages including air interface assignments and other control information for one or more particular UEs. For example, the PDCCH may carry DCI messages to schedule bearer communication on the PDSCH and/or the PUSCH.

In a wireless communication system, a base station may operate to serve UEs on a carrier that spans a particular frequency bandwidth. Further, in some implementations, the base station may be arranged to operate on multiple carriers. In particular, in such an arrangement, the base station may use carrier aggregation to serve multiple UEs on multiple carriers at once. Using carrier aggregation, each such served UE may concurrently receive service from the base station on, for example, two carriers (e.g., referred to as component carriers (CCs)). In an example implementation, the PDSCH may span both such carriers, thereby allowing the base station to allocate bearer communication resources to each of various UEs on both carriers at once. However, in this example implementation, the PDCCH that the base station uses to send DCI messages to a served UE may span only one of the two carriers. This carrier may be the served UE's "primary" carrier while the other carrier may be the served UE's "secondary" carrier. As such, the base station may use cross-carrier scheduling (CCS) to engage in PDCCH communication with a served UE using the primary carrier in order to allocate PDSCH resources on both the primary carrier and the secondary carrier.

The base stations in a wireless communication system can take various forms. For example, a first base station could be a macro base station operated by a wireless carrier to provide a broad range of coverage and may thus include a tall antenna tower and a power amplifier for providing high transmission power. Whereas, a second base station could be a small cell base station ("small cell"), such as a femtocell, typically having a much smaller form factor and operating at lower transmission power for providing a smaller range of coverage.

A wireless communication system may include several such base stations, and in some cases, the base stations may define coverage areas that at least partially overlap. Such overlapping coverage areas may allow for consistency in providing coverage to the UEs while ensuring a seamless handover from one base station to the next. For example, a particular region may include several macro base stations operated by a cellular service provider and positioned in the region in a manner that provides seamless handover while avoiding coverage gaps. However, in some cases, coverage provided by such macro base stations may not extend to a particular area, such as a home or an office. In this case, a small cell (e.g., a femto cell) may fill the coverage gap in the particular area. Other examples may also be possible.

In an arrangement including overlapping coverage areas, such as a macro base station and a small cell defining overlapping coverage areas, both base stations may serve UEs on the same set of multiple carriers. For instance, given two such carriers, both base stations may allocate PDSCH resources on both carriers. In particular, such an arrangement may use CCS to allow the macro base station to allocate PDSCH resources on both a served UE's primary carrier and the served UE's secondary carrier (which may be the served UE's primary carrier for communication with the small cell). Similarly, such an arrangement may use CCS to allow the small cell to allocate PDSCH resources on both a served UE's primary carrier and the served UE's secondary carrier (which may be the served UE's primary carrier for communication with the macro base station). As such, this arrangement may essentially result in the macro base station and the small cell sharing carriers for PDSCH resource allocation.

In such an arrangement, the wireless communication system may be configured for interference management using various techniques. For instance, in order to avoid (or reduce) interference during resource allocation, the base stations may engage in an inter-cell interference coordination (ICIC) process. With an ICIC process, the base stations may exchange information with each other regarding resource assignments such that both base stations avoid resource allocation on the same air interface resources. Additionally, in order to avoid PDCCH interference, each base station's PDCCH may span a different carrier. For instance, as mentioned above, a served UE may use a different carrier as its primary carrier for communication with each respective base station. As a result, each base station may transmit control signaling to the served UE on a different carrier (which may be the served UE's primary carrier for communication with the respective base station), thereby avoiding conflicting PDCCH transmissions.

By way of example, consider a scenario where a first base station and a second base station having overlapping coverage areas operate on carriers A and B. In that scenario, the first base station may engage in PDCCH communication with a served UE using carrier A (i.e., the served UE's primary carrier for communication with the first base station) to allocate PDSCH resources on both carriers A and B. In contrast, the second base station may engage in PDCCH communication with a served UE using carrier B (i.e., the served UE's primary carrier for communication with the second base station) to allocate PDSCH resources on both carriers A and B.

However, such interference management is not limited to a carrier aggregation scenario as a wireless communication system may arrange interference management in any scenario involving a base station operating on a frequency range. For example, given a particular frequency range, the first base station may carry out PDCCH communication on a first portion of the frequency range while the second base station may carry out PDCCH communication on a second portion of the frequency range such that the first and second portions of the frequency range are mutually exclusive, thereby avoiding PDCCH interference. Other examples may also be possible.

The bandwidth of a base station's PDCCH may play a significant role in the base station's capacity to serve UEs in its coverage area. For instance, a wider bandwidth for PDCCH communication may allow a base station to simultaneously transmit more DCI messages in order to serve more UEs compared to a base station having a PDCCH spanning a narrower bandwidth. However, in some cases, when a base station needs to send out many DCI messages (such as when serving many UEs), the base station's PDCCH may become congested or nearly becoming congested.

For example, consider again the arrangement of a macro base station and a small cell defining overlapping coverage areas. Generally, the macro base station may have more connected UEs than the small cell, thereby resulting in a higher extent (e.g., percentage) of the macro base station's PDCCH capacity being used compared to an extent (e.g., percentage) of the small cell's PDCCH capacity being used. This may result in a higher likelihood of the macro base station experiencing congestion during PDCCH communication with served UEs than the small cell experiencing congestion during PDCCH communication with served UEs. Such congestion may impact the wireless network by possibly resulting in delayed transmissions, among other undesirable outcomes.

Disclosed herein is an arrangement to help overcome this problem, and particularly to help avoid congestion of a base station's downlink control channel (i.e., PDCCH). In accordance with the disclosure, a wireless communication system may seek to balance PDCCH capacity of two or more base stations over time such as by changing allocation of downlink control channel resources between the base stations on an ongoing basis. Changing allocation of the air interface resources for downlink control channel use may be in the form of transferring at least a portion of a frequency range or a number of resource elements, among other possibilities, without changing relative allocation of air interface resources for shared/traffic channel use.

Accordingly, disclosed herein is a method operable in a wireless communication system that includes a first base station (e.g., a macro base station) and a second base station (e.g., a small cell). The first base station provides a first downlink control channel having a first capacity spanning a first set of air interface resources (e.g., a first frequency range). Additionally, the second base station provides a second downlink control channel having a second capacity spanning a second set of air interface resources (e.g., a second frequency range). The first set of air interface resources and the second set of air interface resources are mutually exclusive.

In accordance with the method, the wireless communication system detects a threshold difference between (i) an extent of the first capacity being unused and (ii) an extent of the second capacity being unused. The extent of the first capacity being unused may define a percentage of unused air interface resources in the first set of air interface resources over a time period, while the extent of the second capacity being unused may define a percentage of unused air interface resources in the second set of air interface resources over the time period.

In response to at least that detection (among other possible factors), an automatic change of allocation of at least a portion of the air interface resources may occur between the first and second downlink control channels. Such automatic change of allocation results in (i) an increased capacity of one of the first and second downlink control channels and (ii) a decreased capacity of the other one of the first and second downlink control channels. Optimally, this change of allocation of control channel resources is done without there being a commensurate change of allocation of shared/traffic channel resources.

Additionally, disclosed herein is a wireless communication system including a first base station (e.g., a macro base station) that provides a first downlink control channel including a first set of air interface resources. The wireless communication system also includes a second base station (e.g., a small cell) that provides a second downlink control channel including a second set of air interface resources, where the first set of air interface resources and the second set of air interface resources are mutually exclusive. The wireless communication system further includes a controller (e.g., a Mobility Management Entity (MME)) coupled to one or more of the first and second base stations.

The controller is configured to detect a threshold difference between (i) an extent of the first set of air interface resources being unused and (ii) an extent of the second set of air interface resources being unused. In response to at least that detection, the controller automatically changes allocation of at least a portion of the air interface resources between the first and second downlink control channels such that (i) capacity of one of the first and second downlink control channels is increased and (ii) capacity of the other one of the first and second downlink control channels is decreased. For example, the first downlink control channel's frequency range may be increased by the same amount that the second downlink control channel's frequency range is decreased (i.e., by transferring a portion of the second downlink control channel's frequency range to the first downlink control channel).

Further, in another respect, disclosed is a non-transitory computer-readable medium having stored thereon instructions executable by a processor to cause a wireless communication system to carry out functions such as those noted above, to facilitate allocation of control channel resources.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
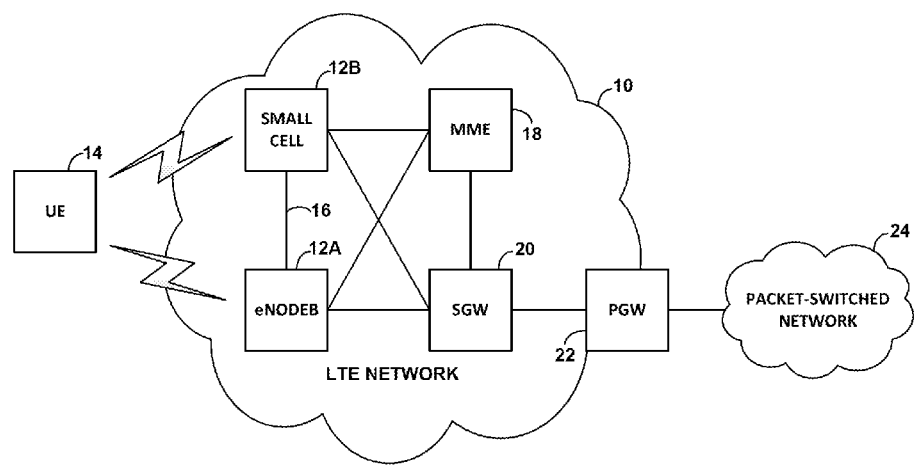
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly a voice over Internet Protocol (VoIP) service, but may also provide other functions. As shown, the LTE network 10 includes an example LTE macro base station known as an eNodeB 12A, which has an antenna structure and associated equipment for providing an LTE coverage area in which to serve UEs such as an example UE 14 as shown. Additionally, the LTE network 10 includes a small cell 12B that radiates to define another coverage area in which to serve UEs such as example UE 14. As further discussed below, the eNodeB 12A and small cell 12B may communicate with each other over an X2 interface 16.

As shown in FIG. 1, the eNodeB 12A and small cell 12B each have a communication interface with an MME 18 that functions as a signaling controller for the LTE network 10. Further, the eNodeB 12A and small cell 12B each have a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12A and small cell 12B may be communicatively linked with one or more core networks, which may be operated by the one or more wireless service providers. The core network(s) then provide connectivity with one or more MMEs, such as MME 18, as well as one or more gateways such as SGW 20 and PGW 22.

In line with the discussion above, the eNodeB 12A and small cell 12B may each provide service on multiple carriers and may be equipped to serve UEs with carrier aggregation using those multiple carriers. Further, UE 14 may be equipped to support carrier aggregation. For certain communications (e.g., for communication of bearer data on one or more particular bearers), the eNodeB 12A and small cell 12B may serve the UE 14 using carrier aggregation, whereas for other communications (e.g., for communication of bearer data on one or more other bearers), the eNodeB 12A and small cell 12B may serve the UE 14 without using carrier aggregation.

In accordance with a recent version of LTE, the air interface on both the downlink and the uplink may span a particular bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond time segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, a base station and a served UE may transmit symbols to each other in these resource elements, particularly on subcarriers that are spaced apart from each other by 15 kHz and in time segments spanning 67 μs each.

Figure 2A:
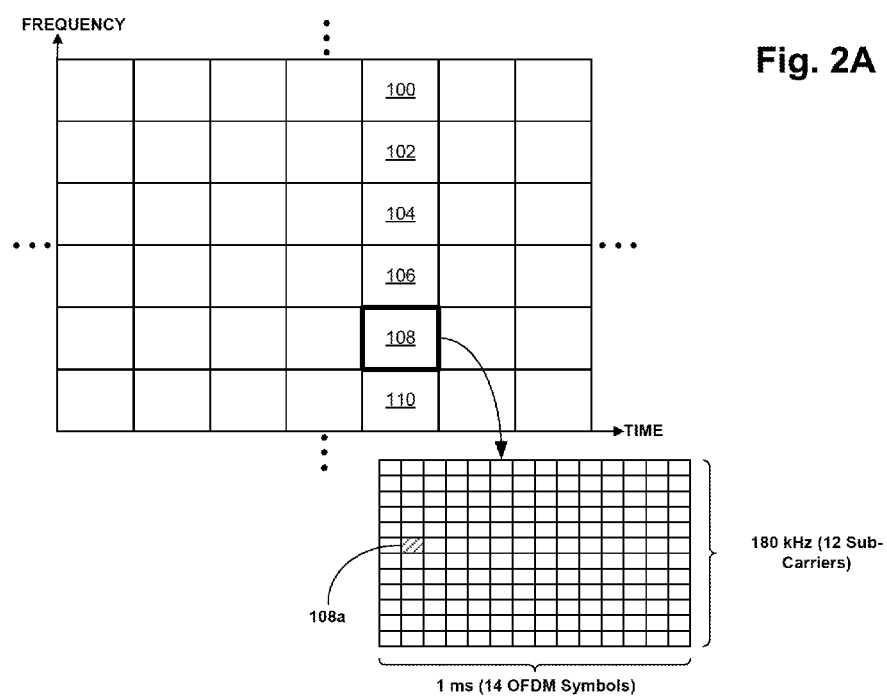
FIG. 2A is a conceptual illustration of a division of a shared downlink channel into downlink resource blocks, in accordance with an example embodiment.

FIG. 2A illustrates how the downlink resources in a given wireless coverage area may be divided in time and frequency domains into resource blocks under LTE. In the time domain, each resource block occupies a 1 ms subframe. By way of example, FIG. 2A shows resource blocks 100-110 for a particular subframe. In the frequency domain, each of resource blocks 100-110 occupies a respective portion of frequency bandwidth, typically 180 kHz. Although FIG. 2A shows six resource blocks in each subframe, a wireless coverage area could have a greater number of resource blocks, as indicated by the dots above and below resource blocks 100-110. For instance, in a 5 MHz LTE carrier, a total of 25 resource blocks may span each 1 ms subframe.

FIG. 2A also includes a more detailed view of downlink resource block 108. This detailed view shows that the 180 kHz of frequency bandwidth corresponds to 12 subcarriers of 15 kHz each, and also shows that the 1 ms subframe corresponds to the duration of 14 OFDM symbols (although the number of OFDM symbols in a downlink resource block can vary). Each OFDM symbol spans the 12 subcarriers and includes a respective subcarrier symbol on each subcarrier. Thus, as noted above, a downlink resource block may be described as a set of resource elements, with each resource element corresponding to a subcarrier symbol that is carried on a particular subcarrier for the duration of one OFDM symbol. The detailed view of downlink resource block 108 in FIG. 2A shows the division of the resource block into multiple resource elements, such as resource element 108a.

Figure 2B:
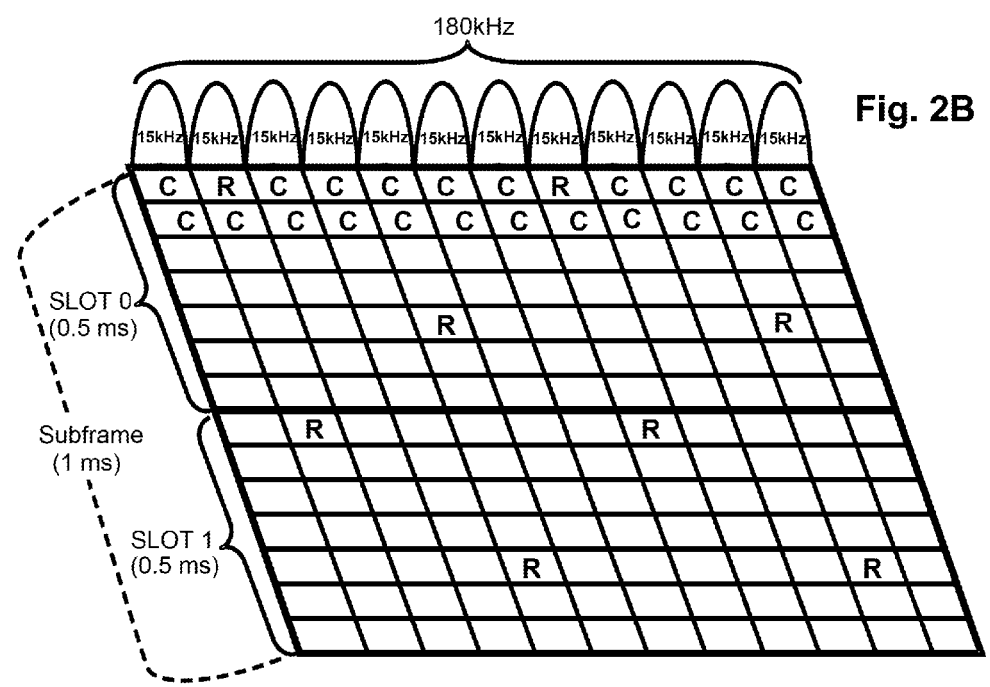
FIG. 2B is a conceptual illustration of a downlink resource block, in accordance with an example embodiment.

Different resource elements in a downlink resource block may be used for different purposes. FIG. 2B illustrates different functions among the 168 resource elements in an example downlink resource block. In this example, 8 of the resource elements are labeled "R" to indicate that they are reserved for reference signals used for channel estimation. In addition, 22 of the resource elements in the first two OFDM symbols are labeled "C" to indicate that they are used to transmit control signaling (including for instance the PDCCH). The other 138 resource elements that are unlabeled can be used to define the PDSCH for transmitting bearer data and other scheduled transmissions. It is to be understood that FIG. 2B illustrates only one possible configuration, and that a downlink resource block could have other configurations as well.

In LTE as currently defined by way of example, a physical control format indicator channel (PCFICH) carries signaling overhead information such as an indication of how many 67 μs time segments are being used for control signaling. Additionally, each PDCCH provides UE-specific control information within a number of control channel elements (CCE), each of which is provided as nine resource element groups (REG), with each REG being four resource elements, mapping four quadrature phase shift keying (QPSK) symbols, for a total of 36 QPSK symbols per CCE. The CCEs are numbered with identifiers, and a base station may allocate particular CCEs to particular UEs by specifying the allocations in the PCFICH, with reference to CCE IDs and UE IDs.

Figure 2C:
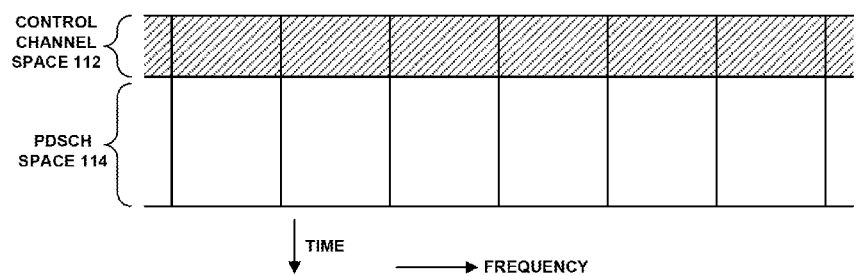
FIG. 2C is a conceptual illustration of a segment of a downlink sub-frame on one carrier, depicting a relationship between downlink control channel and downlink traffic channel.
Figure 2D:
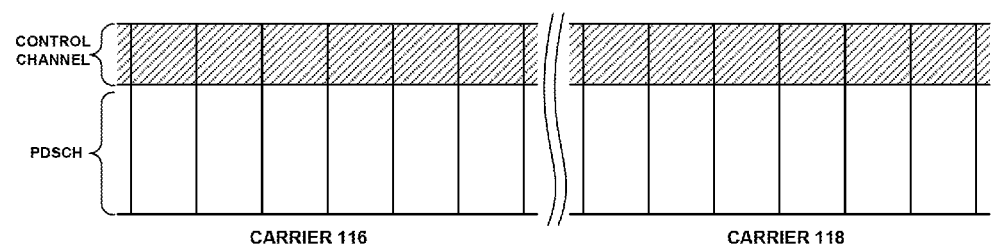
FIG. 2D is a conceptual illustration of a segment of a downlink sub-frame on two carriers, depicting a relationship between downlink control channels and downlink traffic channels.

FIGS. 2C and 2D next depict a segment of an example downlink subframe, to help illustrate the example relationship between the PDCCH and PDSCH across the bandwidth of a representative carrier. In particular, FIG. 2C provides another view of the six example resource blocks 100-110 of FIG. 2A. As shown, a first portion of time (one or more OFDM symbol segments) of each resource block is reserved for use to define control channel space 112 that spans all of the resource blocks in the subframe. The remaining portion of each resource block (other than resource elements reserved for reference symbol use or the like) is then available for use to define PDSCH space 114.

In an example implementation, when a UE 14 is served on this carrier without carrier aggregation, the eNodeB 12A may transmit DCI messages to the UE 14 in the PDCCH of control channel space 112, and those DCI messages may schedule downlink communication of bearer data to the UE 14 in the PDSCH space 114. Through blind decoding, the UE 14 may thus find and read those DCI messages and receive the bearer data from the indicated resources in PDSCH space 114.

FIG. 2D then illustrates a variation on this arrangement, depicting generally two example carriers 116, 118 (which may be contiguous or non-contiguous, and may be in the same band or different bands), with each band including control channel space and PDSCH space. With this arrangement, when a UE 14 is served on carrier 116 with carrier aggregation, the eNodeB 12A may transmit DCI messages to the UE 14 in the PDCCH of carrier 116, and those DCI messages may schedule downlink communication of bearer data to the UE 14 in the PDSCHs of both carrier 116 and 118. Through blind decoding, the UE 14 may thus find and read those DCI messages and receive the bearer data from the indicated resources in those PDSCHs.

Figure 3:
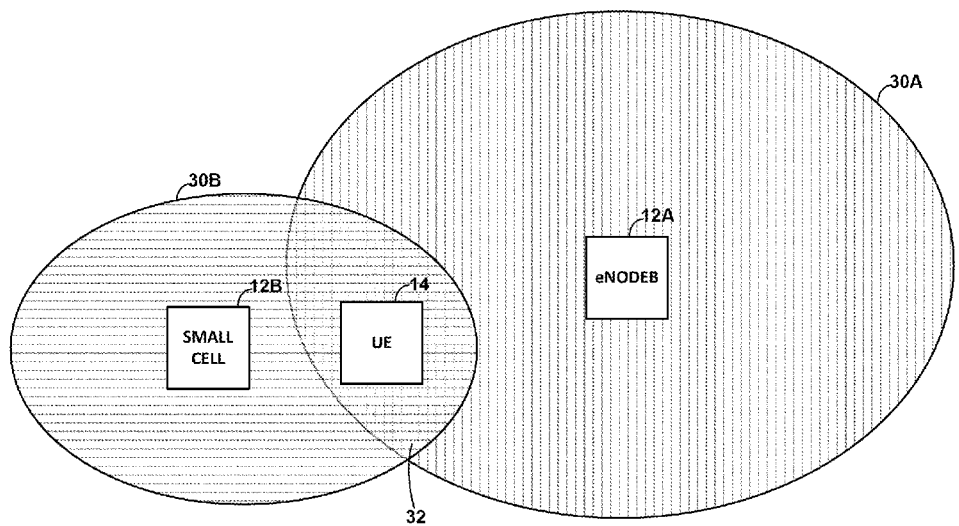
FIG. 3 is a conceptual illustration of first and second base stations defining partially overlapping coverage areas, in accordance with an example embodiment.

As mentioned above, a wireless communication system may include base stations defining coverage areas that at least partially overlap. To illustrate, consider FIG. 3 depicting an arrangement showing the eNodeB 12A defining a coverage area 30A and the small cell 12B defining a coverage area 30B. In the arrangement shown in FIG. 3, coverage area 30A is larger than coverage area 30B because a small cell 12B typically operates at a lower transmission power for providing a smaller range of coverage. However, coverage areas 30A and 30B may take on any size and shape.

Additionally, as shown in FIG. 3, coverage areas 30A and 30B partially overlap in overlapping region 32. Though in another arrangement, small cell coverage area 30B may be entirely within eNodeB coverage area 30A. Various UEs, such as example UE 14, positioned in the overlapping region 32 may receive service from either the eNodeB 12A or the small cell 12B. In this arrangement, as discussed above, the eNodeB 12A and the small cell 12B may serve UEs on the same set of multiple carriers. In practice, the coverage size of areas may differ for different carriers. However, for purposes of illustration only, assume that coverage areas for the set of multiple carriers are the same such that eNodeB 12A and the small cell 12B can serve UE 14 on the same set of multiple carriers. Further, note that the arrangements described herein are not limited to an eNodeB and a small cell and may extend to various types of base stations.

In practice, eNodeB 12A and small cell 12B may also engage in signaling communication with each other, so as to facilitate ICIC for instance. In particular, eNodeB 12A and small cell 12B may communicate with each other over an X2 interface 16, which may physically pass through the core network(s) or over a more direct physical connection between the eNodeB 12A and the small cell 12B. Other example arrangements may also be possible.

Figure 4:
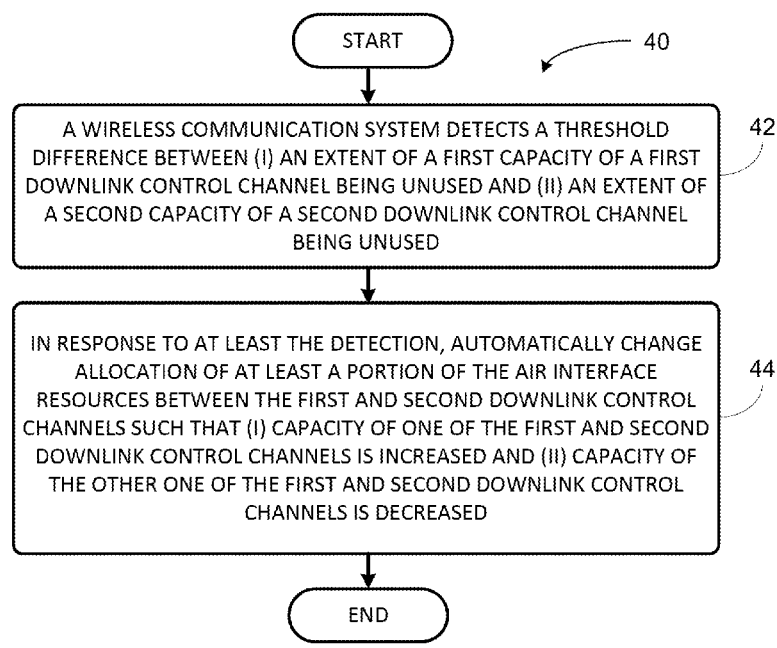
FIG. 4 is a flowchart illustrating a method for changing allocation of control channel resources, in accordance with an example embodiment.

FIG. 4 is a flowchart illustrating a method 40, according to an example embodiment. Illustrative methods, such as method 40, may be carried out in whole or in part by a component(s) and/or arrangement(s) in a wireless communication system, such as by the one or more of the components of the representative LTE network 10 shown in FIG. 1, with one or more of the air interface arrangements shown in FIGS. 2A-2D, and/or with the arrangement shown in FIG. 3. However, it should be understood that example methods, such as method 40, may be carried out by other entities or combinations of entities as well as in other arrangements, without departing from the scope of the invention.

In particular, method 40 may be operable in a wireless communication system that includes a first base station (e.g., eNodeB 12A) and a second base station (e.g., small cell 12B). The first base station may provide a first downlink control channel (i.e., a first PDCCH) and the second base station may provide a second downlink control channel (i.e., a second PDCCH). The first downlink control channel may have a first capacity spanning a first set of air interface resources (e.g., a first frequency range) and the second downlink control channel may have a second capacity spanning a second set of air interface resources (e.g., a second frequency range), where the first set of air interface resources and the second set of air interface resources may be mutually exclusive.

As shown by block 42 in FIG. 4, method 40 involves the wireless communication system detecting a threshold difference between (i) an extent of the first capacity of the first downlink control channel being unused and (ii) an extent of the second capacity of the second downlink control channel being unused. As shown by block 44 in FIG. 4, method 40 next involves, in response to at least the detection, automatically changing allocation of at least a portion of the air interface resources between the first and second downlink control channels such that (i) capacity of one of the first and second downlink control channels is increased and (ii) capacity of the other one of the first and second downlink control channels is decreased.

Figure 5A:
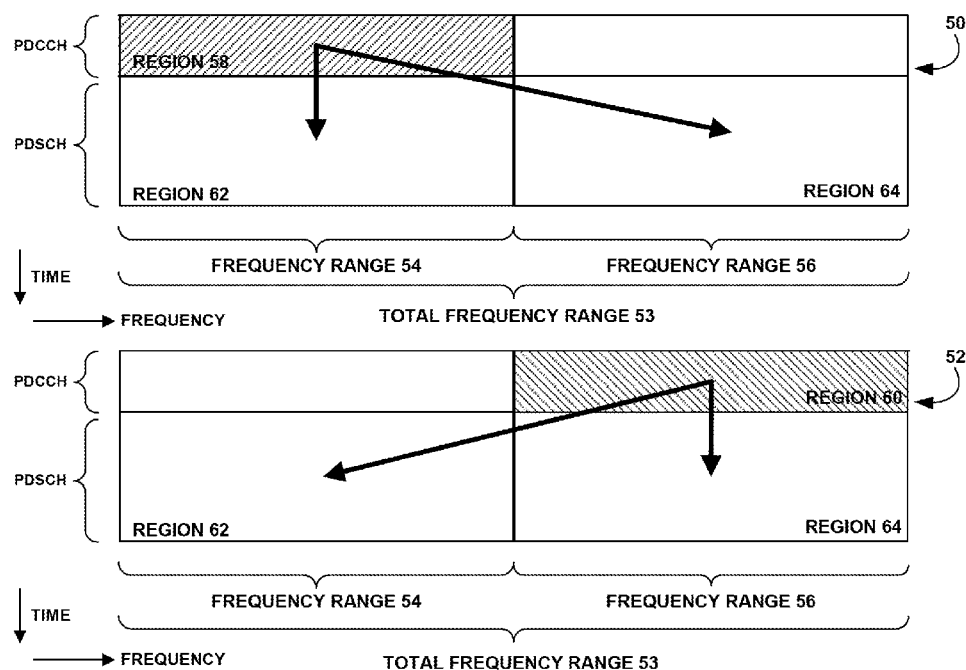
FIG. 5A is a conceptual illustration of air interface resources of the first and second base stations, depicting example allocation of resources to UEs.

To illustrate, consider FIG. 5A showing example resource grids 50 and 52. More specifically, resource grid 50 illustrates the air interface resources used by the first base station while resource grid 52 illustrates the air interface resources used by the second base station. As shown, the resources span a total frequency range 53. In particular, the total frequency range 53 includes the PDCCH resources shown in regions 58 and 60. Moreover, the wireless communication system may divide the total frequency range 53 into two frequency ranges 54 and 56 (which are mutually exclusive and may be contiguous or non-contiguous).

As shown, frequency range 54 includes a first downlink control channel (PDCCH) designated as region 58 while frequency range 56 includes a second downlink control channel (PDCCH) designated as region 60. Additionally, frequency range 54 includes a downlink shared/traffic channel (PDSCH) designated as region 62 and frequency range 56 includes a downlink shared/traffic channel (PDSCH) designated as region 64.

With this arrangement, when a UE is served by the first base station, the first base station may transmit DCI messages to the UE in the PDCCH spanning frequency range 54 (i.e., region 58), and those DCI messages may schedule downlink communication of bearer data to the UE in the PDSCHs spanning frequency ranges 54 and 56 (i.e., regions 62 and 64). Through blind decoding, the UE may thus find and read those DCI messages and receive the bearer data from the indicated resources in those PDSCHs. Such allocation of resources is illustrated by the bold arrows in resource grid 50.

In contrast, when a UE is served by the second base station, the second base station may transmit DCI messages to the UE in the PDCCH spanning frequency range 56 (i.e., region 60), and those DCI messages may schedule downlink communication of bearer data to the UE in the PDSCHs spanning frequency ranges 54 and 56 (i.e., regions 62 and 64). Through blind decoding, the UE may thus find and read those DCI messages and receive the bearer data from the indicated resources in those PDSCHs. Such allocation of resources is illustrated by the bold arrows in resource grid 52.

In this manner, the wireless communication system may initially allocate a first percentage (which can be denoted as R1) of the total PDCCH resources for use by the first base station while allocating a second percentage (which can be denoted as R2) of the total PDDCH resources to the second base station. The first and second percentages may together amount to one hundred percent of the total PDCCH resources spanning the total frequency range 53.

As noted above, method 40 involves the wireless communication system detecting a threshold difference between (i) an extent of the first capacity of the first downlink control channel being unused and (ii) an extent of the second capacity of the second downlink control channel being unused. A controller (e.g., MME 18) and/or one or more other possible entities of the wireless communication system may carry out such detection. The controller can be coupled to one of the first and second base stations, among other possibilities.

During a particular subframe, the wireless communication system may determine the extent to which the downlink control channel resources are being unused by each of the first and second base stations. For instance, the wireless communication system may determine the extent of the first capacity being unused by defining a percentage of unused air interface resources in the first set of air interface resources. Similarly, the wireless communication system may determine the extent of the second capacity being unused by defining a percentage of unused air interface resources in the second set of air interface resources.

In one case, the wireless communication system can determine such percentages by calculating a number of unused resource elements in a given downlink control channel relative to a total number of resource elements in the given downlink control channel during a particular subframe. For example, during a subframe, the first downlink control channel may span a total of 100 resource elements while the second downlink control channel may span a total of 80 resource elements. During this subframe, the first downlink control channel may include 30 unused resource elements, thereby amounting to a percentage of unused air interface resources in the first downlink control channel of 30%. During the same subframe, the second downlink control channel may include 40 unused resource elements, thereby amounting to a percentage of unused air interface resources in the second downlink control channel of 50%.

In another case, the wireless communication system can determine such percentages by calculating a number of unused CCEs in a given downlink control channel relative to a total number of CCEs in the given downlink control channel during a particular subframe. For example, during a subframe, the first downlink control channel may span a total of 10 CCEs while the second downlink control channel may span a total of 5 CCEs. During this subframe, the first downlink control channel may include 1 unused CCE, thereby amounting to a percentage of unused air interface resources in the first downlink control channel of 10%. During the same subframe, the second downlink control channel may include 2 unused CCEs, thereby amounting to a percentage of unused air interface resources in the second downlink control channel of 40%.

In yet another case, the wireless communication system can determine such percentages by evaluating the extent of subcarriers of a given downlink control channel being unused. For example, during a particular subframe, the first downlink control channel may span 6 subcarriers (e.g., frequency range 54) while the second downlink control channel may also span 6 subcarriers (e.g., frequency range 56). During this subframe, the first downlink control channel may include 3 subcarriers being unused, thereby amounting to a percentage of unused air interface resources in the first downlink control channel of 50%. During the same subframe, the second downlink control channel may include 2 subcarriers being unused, thereby amounting to a percentage of unused air interface resources in the second downlink control channel of 33%.

The system can make the above statistical evaluations instantaneously (e.g., during a particular subframe) or in advance (e.g., several subframes prior to a subframe when a PDCCH being evaluated for an extent of resource being unused is arranged to carry DCI messages in order to schedule bearer communications). Additionally, some cases may involve predictive analysis, such as predicting a future extent of PDCCH resources being unused based on historical data, among other examples. Note that other statistical evaluations for making the determination may also be possible. Also, note that these and other examples are discussed for illustration purposes only.

Over time, the wireless communication system may collect and store a plurality of measurements, where each measurement corresponds to an extent of air interface resource being unused in a downlink control channel during a subframe. In particular, the wireless communication system may collect these measurements on a continuous basis (e.g., every subframe) or from time-to-time (e.g., once every several subframes). As a result, the wireless communication system can maintain of historical database of measurements (e.g., percentages) and use the measurements to determine the extent of PDCCH resources being unused over various time periods.

For instance, the wireless communication system may determine the extent of the first capacity being unused as a first average (e.g., denoted as P1) of a first set of measurements established over a time period. The time period may include one or more subframes. In one example, the time period may include the five subframes prior to a current subframe arranged to carry DCI messages in order to schedule bearer communications. In another example, the time period may only include the current subframe (i.e., resulting in a single measurement). Other examples may also be possible. Additionally, each measurement in the first set of measurements can correspond to a percentage of unused air interface resources in the first downlink control channel at a different time (e.g., at different subframes) during that time period. As a result, the first average can amount to an average percentage representing an extent of resources being unused in the first downlink control channel over the time period.

Similarly, the wireless communication system may determine the extent of the second capacity being unused as a second average (e.g., denoted as P2) of a second set of measurements established over the same time period. Each measurement in this second set of measurements can correspond to a percentage of unused air interface resources in the second downlink control channel at a different time during that time period.

In one case, the different times used for the determination of the second average may align with the different times used for the determination of the first average discussed above. For example, the second set of measurements may include measurements taken at the same times (e.g., same subframes) as the measurements in the first set of measurements. In another case, the different times used for the determination of the second average may at least partially not align with the different times used for the determination of the first average discussed above. For example, the second set of measurements may include at least some measurements taken at times that are different from the times when the measurements in the first set of measurements were taken. In either case, the second average amounts to an average percentage representing an extent of resources being unused in the second downlink control channel over the time period.

Upon making the above determinations, the wireless communication system may compare the extent of the first capacity of the first downlink control channel being unused to the extent of the second capacity of the second downlink control channel being unused. For example, the wireless communication system may determine a difference between the first and second averages (e.g., $\Delta=P1-P2$ or $\Delta=P2-P1$). This difference amounts to comparing the percentage of unused resources in the first downlink control channel over the time period to the percentage of unused resources in the second downlink control channel over the same time period.

Moreover, the wireless communication system may detect whether the determined difference exceeds a threshold difference (e.g., a predetermined threshold difference). In one case, the wireless communication system may detect whether the first downlink control channel has a threshold greater percentage of unused resources than the second downlink control channel. In another case, the wireless communication system may detect whether the second downlink control channel has a threshold greater percentage of unused resources than the first downlink control channel. In yet another case, the wireless communication system may detect both (i) whether the first downlink control channel has a threshold greater percentage of unused resources than the second downlink control channel or (ii) whether the second downlink control channel has a threshold greater percentage of unused resources than the first downlink control channel.

In this case, the wireless communication system can make these determinations in any order. For example, the wireless communication system may first determine whether the first downlink control channel has a threshold greater percentage of unused resources than the second downlink control channel. If this threshold difference is exceeded, the wireless communication system may responsively conduct the change of allocation of air interface resources as further discussed below in association with block 44 of method 40. However, if this threshold difference is not exceeded, the wireless communication system may then determine whether the second downlink control channel has a threshold greater percentage of unused resources than the first downlink control channel.

Alternatively, the wireless communication system may first determine whether the second downlink control channel has a threshold greater percentage of unused resources than the first downlink control channel. If this threshold difference is exceeded, the wireless communication system may responsively conduct the change of allocation of air interface resources as further discussed below in association with block 44 of method 40. However, if this threshold difference is not exceeded, the wireless communication system may then determine whether the first downlink control channel has a threshold greater percentage of unused resources than the second downlink control channel.

Additionally, the threshold difference being detected when the system determines whether the first downlink control channel has a threshold greater percentage of unused resources than the second downlink control channel may correspond to a first threshold difference. Whereas, the threshold difference being detected when the system determines whether the second downlink control channel has a threshold greater percentage of unused resources than the first downlink control channel may correspond to a second threshold difference.

In one case, the first threshold difference may be the same as the second threshold difference. For example, the wireless communication system may determine whether the percentage of unused resources in the first downlink control channel is 10% greater than the percentage of unused resources in the second downlink control channel. Similarly, the wireless communication system may determine whether the percentage of unused resources in the second downlink control channel is 10% greater than the percentage of unused resources in the first downlink control channel.

In another case, the first threshold difference may be different from the second threshold difference. For example, the wireless communication system may determine whether the percentage of unused resources in the first downlink control channel is 20% greater than the percentage of unused resources in the second downlink control channel. However, when determining whether the second downlink control channel has a threshold greater percentage of unused resources than the first downlink control channel, the wireless communication system may determine whether the percentage of unused resources in the second downlink control channel is 15% greater than the percentage of unused resources in the first downlink control channel.

In this manner, the wireless communication system may determine whether the first base station is over-allocated with PDCCH resources compared to the second base station or whether the second base station is over allocated with PDCCH resources compared to the first base station. Based on determining a threshold difference, the wireless communication system may then change allocation of resources.

As noted above, method 40 involves, in response to at least the detection, automatically changing allocation of (e.g., transferring) at least a portion of the air interface resources between the first and second downlink control channels such that (i) capacity of one of the first and second downlink control channels is increased and (ii) capacity of the other one of the first and second downlink control channels is decreased.

Detecting the threshold difference as discussed above may serve as an indication to the wireless communication system to change allocation of PDCCH resources between the base stations, thereby providing a way to fairly balance the PDCCH resources. Additionally, the controller (e.g., MME 18) may carry out such an automatic change of allocation (among other possible entities of the wireless communication system). In particular, the controller may carry out the change of allocation by exchanging messages with the base stations (and/or one or more other entities) in order to arrange a time for the transfer of the resources and/or in order to inform the base stations of the particular resources to be used for the transfer, among other possibilities. Further, the manner in which the wireless communication system carries out this change of allocation may depend on the specific threshold exceeded (or not exceeded).

In one example, the wireless communication system may determine that the first downlink control channel has a threshold greater percentage of unused resources than the second downlink control channel (i.e., that a threshold difference is exceeded). Based on a determination that this threshold difference is exceeded, the wireless communication system may change allocation of resources by transferring some amount (e.g., denoted as A) of the PDCCH resources from the first downlink control channel to the second downlink control channel, thereby decreasing capacity of the first downlink control channel while increasing capacity of the second downlink control channel.

In an example implementation, the wireless communication system may define the amount (i.e., A) as a percentage. In this implementation, the wireless communication system may carry out this change of allocation by decreasing the first percentage (i.e., R1−A) of the total PDCCH resources allocated for use by the first base station while increasing the second percentage (i.e., R2+A) of the total PDDCH resources allocated for use by the second base station. In other example implementations, the wireless communication system may define the amount (i.e., A) as a number of resource elements, a number of CCEs, or a frequency range, among other options.

In an alternative scenario, the wireless communication system may determine that the first downlink control channel does not have a threshold greater percentage of unused resources than the second downlink control channel (i.e., that the threshold difference is not exceeded). In one embodiment, based on a determination that this threshold difference is not exceeded, the wireless communication system may not change allocation of PDCCH resources. In another embodiment, based on a determination that this threshold difference is not exceeded, the wireless communication system may change allocation of resources by transferring some amount of the PDCCH resources from the second downlink control channel to the first downlink control channel, thereby decreasing capacity of the second downlink control channel while increasing capacity of the first downlink control channel. Other example embodiments may also be possible.

In another example, the wireless communication system may determine that the second downlink control channel has a threshold greater percentage of unused resources than the first downlink control channel (i.e., that a threshold difference is exceeded). Based on a determination that this threshold difference is exceeded, the wireless communication system may change allocation of resources by transferring some amount of the PDCCH resources from the second downlink control channel to the first downlink control channel, thereby increasing capacity of the first downlink control channel while decreasing capacity of the second downlink control channel.

However, the wireless communication system may alternatively determine that the second downlink control channel does not have a threshold greater percentage of unused resources than the first downlink control channel (i.e., that the threshold difference is not exceeded). In one embodiment, based on a determination that this threshold difference is not exceeded, the wireless communication system may not change allocation of PDCCH resources upon making such a determination. In another embodiment, based on a determination that this threshold difference is not exceeded, the wireless communication system may change allocation of resources by transferring some amount of the PDCCH resources from the first downlink control channel to the second downlink control channel, thereby decreasing capacity of the first downlink control channel while increasing capacity of the second downlink control channel. Other example embodiments may also be possible.

In this manner, the wireless communication system may (continuously or from time-to-time) change allocation of some amount of PDCCH resources between the base stations based on the extent of one of the downlink control channels being unused compared to the extent of the other one of the downlink control channels being unused. The specific amount of PDCCH resources that is transferred between the base stations may be predetermined or may vary depending, for example, on the magnitude by which the determined difference exceeds the threshold difference. Alternatively, the system may select the specific amount so as to avoid the ping pong effect such as by avoiding continuous back and forth transfer of resources between the downlink control channels.

Figure 5B:
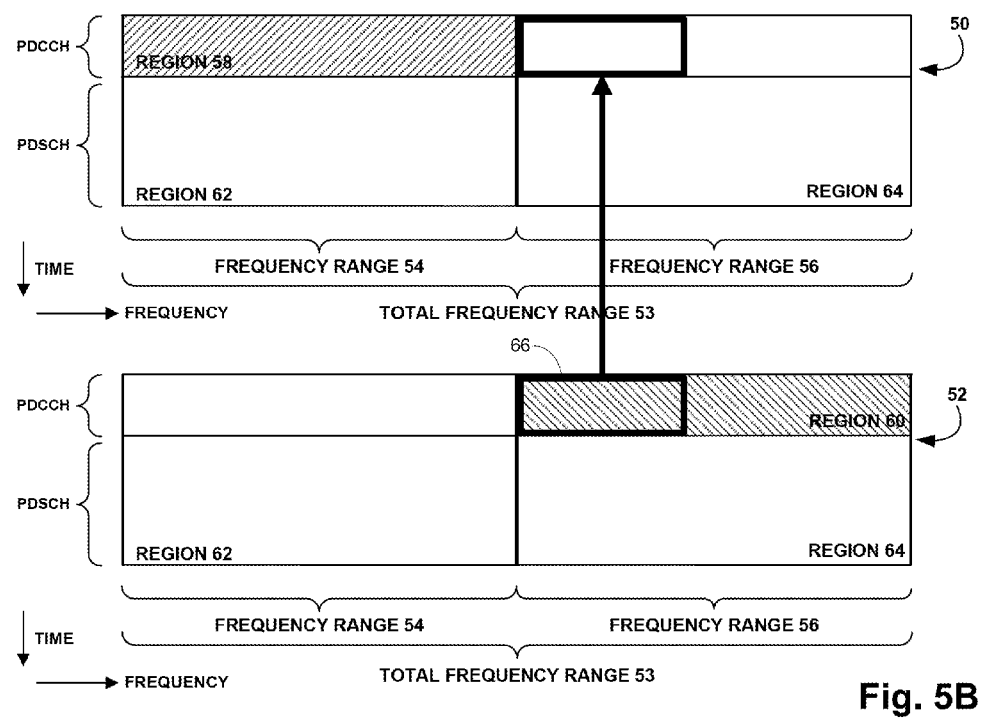
FIGS. 5B and 5C are conceptual illustrations of air interface resources of the first and second base stations, depicting a transfer of a portion of the air interface resources.

To illustrate the process of automatically changing allocation of air interface resources, consider FIG. 5B depicting the example resource grids 50 and 52 as first introduced above in association with the discussion of FIG. 5A. FIG. 5B depicts a portion 66 of the second downlink control channel (i.e., region 60). More specifically, portion 66 may be a particular frequency bandwidth that encompasses a part of (or all of) frequency range 56. As illustrated by the bold arrow in FIG. 5B, a controller may arrange a transfer of the portion 66 from the second downlink control channel to the first downlink control channel (i.e., region 58) such that (i) capacity of the first downlink control channel is increased and (ii) capacity of the second downlink control channel is decreased.

Figure 5C:
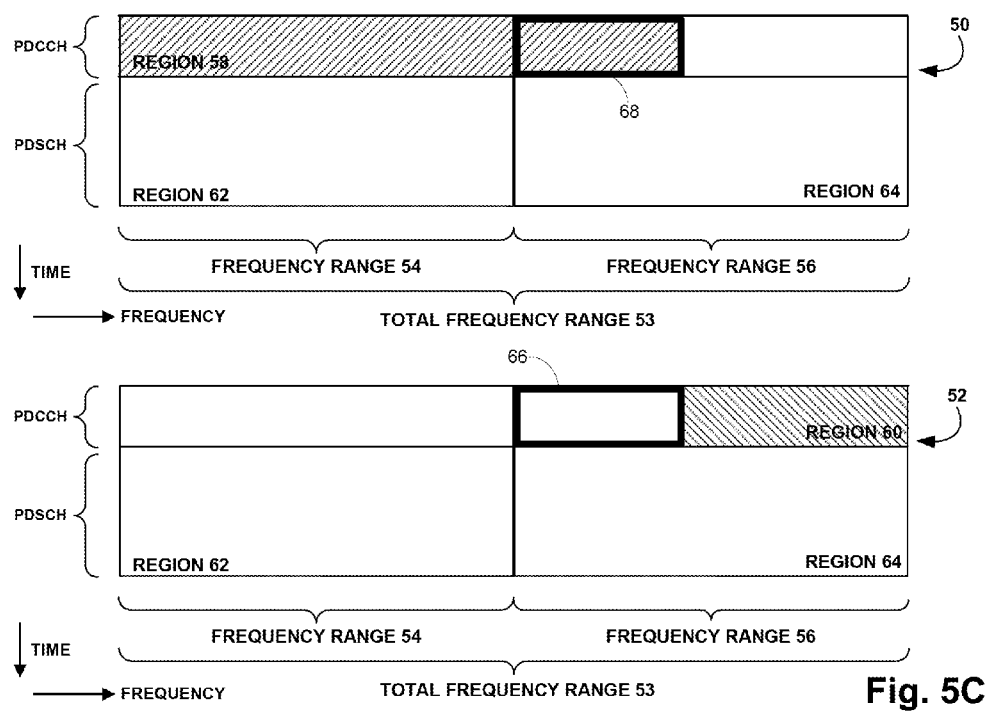

As shown in FIG. 5C, upon completion of the transfer, capacity of the first downlink control channel is increased by portion 68 (spanning the same frequency bandwidth as portion 66). As a result, after the transfer, the first downlink control channel spans the frequency range 54 in addition to portion 68 as shown in resource grid 50 of FIG. 5C. In contrast, capacity of the second downlink control channel is decreased by portion 66. As a result, after the transfer, the second downlink control channel spans the frequency range 56 minus portion 66 as shown in resource grid 52 of FIG. 5C.

Note that this transfer of control channel resources is done without there being a commensurate transfer of shared/traffic channel resources. Also, note that portion 66 is shown for illustration purposes only as portion 66 may encompass any part of frequency range 56. Additionally, note that the automatic change of allocation of air interface resources may involve a transfer of two or more portions rather than a single portion as illustrated by FIG. 5B. In that case, the two or more portions may be contiguous or non-contiguous and may encompass any part of frequency range 56. Other examples may also be possible.

In a further aspect, the first base station may inform one or more of the UEs served by the first base station (e.g., using a system information block (SIB) message) of the scope of the first downlink control channel after the automatic change of allocation. Also, the second base station may inform one or more of the UEs served by the second base station (e.g., using a SIB message) of the scope of the second downlink control channel after the automatic change of allocation.

In yet a further aspect, despite a detection of a threshold difference between (i) an extent of the first capacity of the first downlink control channel being unused and (ii) an extent of the second capacity of the second downlink control channel being unused, an example situation may involve only a small percentage of the first capacity being unused and/or only a small percentage of the second capacity being unused. In this situation, changing allocation of resources may be undesirable as one of the base stations (e.g., the second base station) may not have sufficient downlink control channel resources available for transfer to the other base station (e.g., the first base station).

Given this example situation, some implementations may involve, prior to automatically changing allocation of resources, the system making a determination that a base station has resource availability. As a result, changing allocation of resources may be further in response to such a determination (i.e., in addition to detecting the threshold difference). In this manner, the wireless communication system can ensure that a base station has resource availability prior to transferring air interface resources.

A wireless communication system may determine whether a base station has resource availability in various ways. In particular, the base stations may communicate with each other (e.g., by exchanging messages over the X2 interface 16) and/or with the controller to determine whether or not a given base station has resource availability. For example, a controller may send a message to the second base station indicating the amount of air interface resources (e.g., a number of resource elements) involved in the change of allocation as well as asking whether or not the second base station has sufficient resource availability to meet the indicated amount of air interface resources. The second base station may then respond with a message expressing whether or not the second base station has the sufficient resource availability.

In one case, if the message expresses that the second base station has the sufficient resource availability, additional messages may be exchanged between the base stations (or the base station(s) and the controller) until an agreement is reached for transferring a portion of the second set of air interface resources from the second downlink control channel to the first downlink control channel. In particular, the exchange of additional messages may involve message(s) indicating the particular resources available for transfer (e.g., particular symbol or CCE assignments) as well as confirmation message(s) used to reach an agreement for transfer of the particular available resources, among other possible messages.

In another case, if the message expresses that the second base station does not have the sufficient resource availability but that the second base station has some available resources, messages may be exchanged until an agreement is reached for transferring whatever available resources the second base station does have. In this manner, capacity of the first downlink control channel may increase such that the first base station has at least some additional resources for control signaling, thereby balancing PDCCH resource allocation to some extent. Alternatively, upon receiving a message expressing that the second base station does not have the sufficient resource availability, the system may not carry out the change of allocation. Other cases may also be possible.

A wireless communication system may use the techniques discussed above to fairly balance downlink control channel resource allocation between base stations. Additionally, while the above techniques are discussed in the context of unused resources, the embodiments disclosed herein may also apply in the context of used resources. In such an arrangement, a comparison of used resources in the downlink control channels may essentially provide another way of achieving a comparison of unused resources in the downlink control channels.

For instance, a wireless communication system may detect a threshold difference between (i) an extent of a first capacity of a first downlink control channel being used and (ii) an extent of a second capacity of a second downlink control channel being used. In response to this detection, the wireless communication system may change allocation of at least a portion of the air interface resources between the first and second downlink control channels. For example, if a percentage of used resources in the first downlink control channel is threshold greater than a percentage of used resources in the second downlink control channel, the wireless communication system may transfer some amount of air interface resources from the second downlink control channel to the first downlink control channel. Other examples may also be possible.

Further, while the above techniques are discussed in the context of two base stations, the embodiments disclosed herein can extend to any number of base stations. For example, consider an arrangement including a macro base station having at least a partially overlapping coverage area with multiple small cells (where the coverage areas of the small cells do not overlap with one another). In this arrangement, the macro base station may provide a PDCCH, each small cell may provide a PDCCH, and the wireless communication system may determine an extent of the capacity of each such PDCCH being unused.

For example, if the arrangement includes three small cells, the first small cell may provide a first PDCCH, the second small cell may provide a second PDCCH, and the third small cell may provide a third PDCCH. In this example, the wireless communication system may determine (i) a percentage of unused resources in the first PDCCH, (ii) a percentage of unused resources in the second PDCCH, and (iii) a percentage of unused resources in the third PDCCH. The wireless communication system may then select the maximum (i.e., highest) percentage among these percentages, where such a maximum percentage indicates that a small cell is over allocated with PDCCH resources compared to the other small cells. Subsequently, the wireless communication system may use this maximum percentage as a representation of the extent of PDCCH resources being unused among the small cells and compare this maximum percentage to the extent (e.g., percentage) of the macro base station's PDCCH being unused.

In the above arrangement, the wireless communication system may detect a threshold difference between (i) an extent of the macro base station's PDCCH being unused and (ii) an extend of the PDCCH resources among the small cells being unused. In response to such a detection, the wireless communication system may change allocation of air interface resource between the macro base station and one or more of the small cells.

Yet further, the above technique may also apply in the context of a single base station. The single base station may provide service on first and second carriers. Such a single base station may provide a first PDCCH on the first carrier and a second PDCCH on the second carrier. In particular, the single base station may engage in PDCCH communication with some served UE using the first PDCCH in order to allocate PDSCH resources on both the first and second carriers. Whereas, the single base station may engage in PDCCH communication with other served UE using the second PDCCH in order to allocate PDSCH resources on both the first and second carriers. When the single base station detects a threshold difference between (i) an extent of the first PDCCH being unused and an (ii) extent of the second PDCCH being unused, the wireless communication system may change allocation of resources between the first and second PDCCHs such that (i) capacity of one of the first and second PDCCHs is increased and (ii) capacity of the other one of the first and second PDCCHs is decreased. Other example implementations may also be possible.

Exemplary embodiments have been described above. Those skilled in the art will understand, however, that changes and modifications may be made to these embodiments without departing from the true scope and spirit of the invention.

We claim:

1. A method operable in a wireless communication system including (i) a first base station that provides a first downlink control channel having a first capacity spanning a first set of air interface resources and (ii) a second base station that provides a second downlink control channel having a second capacity spanning a second set of air interface resources, the first set of air interface resources and the second set of air interface resources being mutually exclusive, the method comprising:

detecting, by the wireless communication system, a threshold difference between (i) an extent of the first capacity being unused and (ii) an extent of the second capacity being unused; and in response to at least the detecting, automatically changing allocation of at least a portion of the air interface resources between the first and second downlink control channels such that (i) capacity of one of the first and second downlink control channels is increased and (ii) capacity of the other one of the first and second downlink control channels is decreased.

2. The method of claim 1, wherein the extent of the first capacity being unused defines a percentage of unused air interface resources in the first set of air interface resources over a time period, and wherein the extent of the second capacity being unused defines a percentage of unused air interface resources in the second set of air interface resources over the time period.

3. The method of claim 2, wherein the percentage of unused air interface resources in the first set of air interface resources comprises a number of unused resource elements in the first downlink control channel relative to a total number of resource elements in the first downlink control channel, and wherein the percentage of unused air interface resources in the second set of air interface resources comprises a number of unused resource elements in the second downlink control channel relative to a total number of resource elements in the second downlink control channel.

4. The method of claim 1, wherein the extent of the first capacity being unused defines a first average of a first set of measurements, established over a time period, each corresponding to a percentage of unused air interface resources in the first set of air interface resources at a different time, and wherein the extent of the second capacity being unused defines a second average of a second set of measurements, established over the time period, each corresponding to a percentage of unused air interface resources in the second set of air interface resources at a different time.

5. The method of claim 1, wherein the first base station comprises a macro base station, and wherein the second base station comprises a small cell.

6. The method of claim 1, wherein the first base station defines a first coverage area, wherein the second base station defines a second coverage area, and wherein the first coverage area at least partially overlaps with the second coverage area.

7. The method of claim 1, wherein the wireless communication system further includes a controller, the method further comprising the controller managing the automatic change of allocation.

8. The method of claim 7, wherein the controller comprises a Mobility Management Entity (MME).

9. The method of claim 1, wherein the first set of air interface resources comprises a first frequency range, wherein the second set of air interface resources comprises a second frequency range, and wherein the first frequency range and the second frequency range are mutually exclusive.

10. A wireless communication system comprising:
a first base station that provides a first downlink control channel including a first set of air interface resources;
a second base station that provides a second downlink control channel including a second set of air interface resources, wherein the first set of air interface resources and the second set of air interface resources are mutually exclusive; and
a controller coupled to one of the first and second base stations, wherein the controller is configured to:
detect a threshold difference between (i) an extent of the first set of air interface resources being unused and (ii) an extent of the second set of air interface resources being unused; and
in response to at least the detection, automatically changing allocation of at least a portion of the air interface resources between the first and second downlink control channels such that (i) capacity of one of the first and second downlink control channels is increased and (ii) capacity of the other one of the first and second downlink control channels is decreased.

11. The wireless communication system of claim 10, wherein the extent of the first set of air interface resources being unused defines a percentage of unused air interface resources in the first set of air interface resources over a time period, and wherein the extent of the second set of air interface resources being unused defines a percentage of unused air interface resources in the second set of air interface resources over the time period.

12. The wireless communication system of claim 11, wherein the percentage of unused air interface resources in the first set of air interface resources comprises a number of unused resource elements in the first downlink control channel relative to a total number of resource elements in the first downlink control channel, and wherein the percentage of unused air interface resources in the second set of air interface resources comprises a number of unused resource elements in the second downlink control channel relative to a total number of resource elements in the second downlink control channel.

13. The wireless communication system of claim 10, wherein the extent of the first set of air interface resources being unused defines a first average of a first set of measurements, established over a time period, each corresponding to a percentage of unused air interface resources in the first set of air interface resources at a different time, and wherein the extent of the second set of air interface resources being unused defines a second average of a second set of measurements, established over the time period, each corresponding to a percentage of unused air interface resources in the second set of air interface resources at a different time.

14. The wireless communication system of claim 10, wherein the first base station comprises a macro base station, and wherein the second base station comprises a small cell.

15. The wireless communication system of claim 10, wherein the first base station defines a first coverage area, wherein the second base station defines a second coverage area, and wherein the first coverage area at least partially overlaps with the second coverage area.

16. A non-transitory computer readable medium having stored thereon instructions executable by a processor to cause a wireless communication system to perform functions, the wireless communication system including (i) a first base station that provides a first downlink control channel having a first capacity spanning a first set of air interface resources and (ii) a second base station that provides a second downlink control channel having a second capacity spanning a second set of air interface resources, the first set of air interface resources and the second set of air interface resources being mutually exclusive, the functions comprising:
detecting a threshold difference between (i) an extent of the first capacity being unused and (ii) an extent of the second capacity being unused; and
in response to at least the detecting, automatically changing allocation of at least a portion of the air interface resources between the first and second downlink control channels such that (i) capacity of one of the first and second downlink control channels is increased and (ii) capacity of the other one of the first and second downlink control channels is decreased.

17. The non-transitory computer readable medium of claim 16, wherein the wireless communication system further includes a controller, the functions further comprising the controller managing the automatic change of allocation.

18. The non-transitory computer readable medium of claim 17, wherein the controller is coupled to one of the first and second base stations.

19. The non-transitory computer readable medium of claim 17, wherein the controller comprises a Mobility Management Entity (MME).

20. The non-transitory computer readable medium of claim 16, wherein the first set of air interface resources comprises a first frequency range, wherein the second set of air interface resources comprises a second frequency range, and wherein the first frequency range and the second frequency range are mutually exclusive.

* * * * *